Feb. 8, 1944.  A. BOOTH  2,341,076
VARIABLE SPEED GEAR
Filed July 12, 1943  2 Sheets-Sheet 2
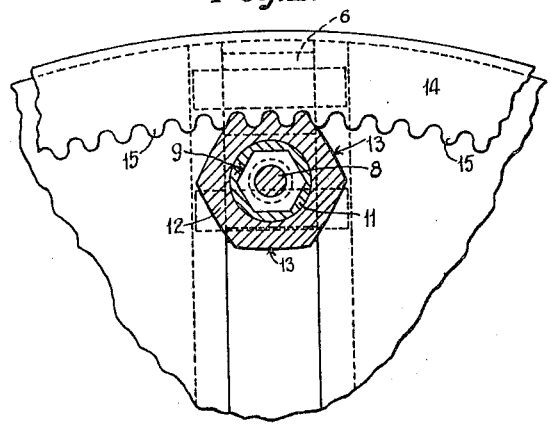
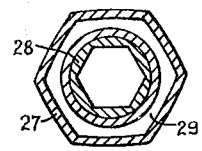
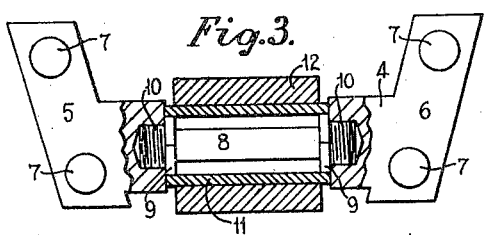
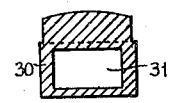
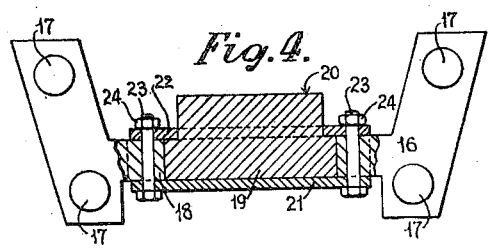
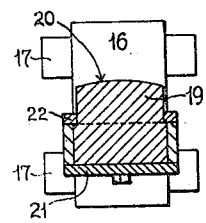
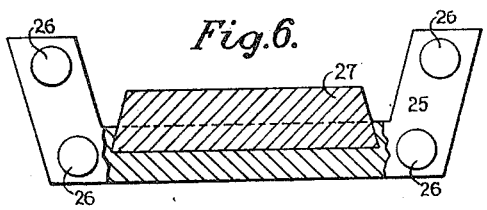
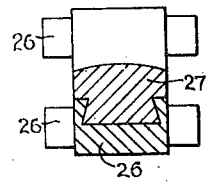
Inventor
Alfred Booth
per Ferdinand Broster Bonhardt
Attorney.

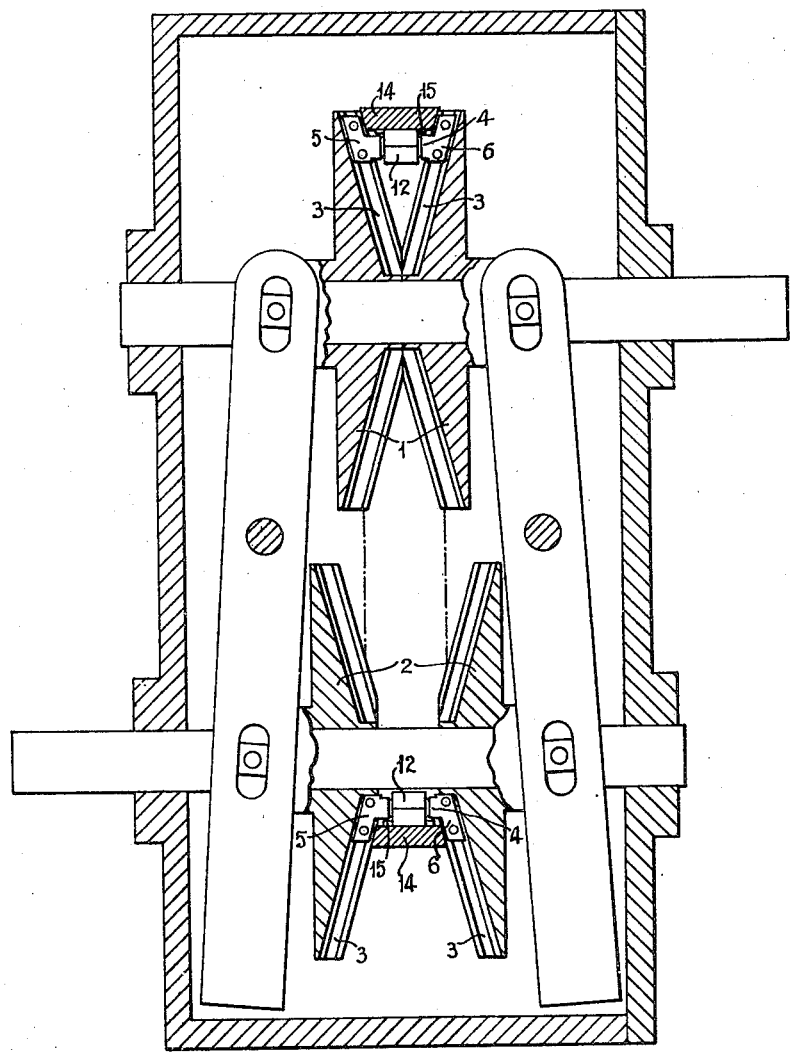

Patented Feb. 8, 1944

2,341,076

UNITED STATES PATENT OFFICE 2,341,076

VARIABLE SPEED GEAR

Alfred Booth, Pendleton, Salford, England, assignor of one-half to Fred Horace Coles, Epsom, Surrey, England Application July 12, 1943, Serial No. 494,364
In Great Britain September 21, 1942

7 Claims. (Cl. 74—230.17)

This invention relates to variable speed gears which are infinitely variable within predetermined limits, and has for its object to provide a novel construction which, whilst not requiring great accuracy in production and being relatively simple, is positive in action under normal loads, is silent and shock-absorbing, and is not liable to accidental damage or strain.

A variable speed gear, in accordance with my invention comprises expanding V-pulleys on which rides an endless chain or belt provided with teeth on its inner surface, and slides adapted to move radially on the said pulleys and carrying a resilient or elastic member into the surface of which the said teeth sink temporarily against the resilient or elastic action of the member whilst in contact with the said member and thereby form between the chain or belt and the V-pulleys a non-slipping driving connection.

The said member may consist of a solid piece of rubber or of a piece of rubber having a hollow in which a fluid or a material having a different resiliency or elasticity from the said rubber may be imprisoned.

The said member may be arranged adjustable to enable different portions to be utilized as required.

Alternatively, or additionally, the said member may be disconnectably secured to the slide to enable it to be readily renewed.

The said member may be in the form of a synthetic rubber block adapted to be mounted and releasably fixed on the slide in various angular positions.

Alternatively the said member may be in the form of a rubber block vulcanized or otherwise permanently affixed to the slide.

I attain the said object by the means illustrated in the accompanying drawings, wherein—

Figure 1 is a side view in section of a variable speed gear.

Figure 2 is a fragmentary front view in section of a part of the said gear.

Figure 3 is a detached side view, partly in section, of a slide.

Figure 4 is a detached side view, partly in section, of a slide and illustrates another construction.

Figure 5 is a detached front view in section of a slide of the last named construction.

Figure 6 is a detached side view, partly in section, of a slide and illustrates still another construction.

Figure 7 is a detached front view in section of a slide of the last named construction.

Figures 8 and 9 are detached front views in section of details and each illustrates a different modification.

Referring to the drawings, in the construction shown in Figures 1 to 3, each of the expanding V-pulleys 1 and 2 respectively of the variable speed gear has any suitable number of registering radial, undercut slots 3 in its opposed conical surfaces and a slide 4 extending from one opposed slot to the other and engaging the slots is slidable in the slots towards and away from the centre of the pulley without being free to become disconnected from the slots. Each slide comprises two parts 5 and 6 respectively which enter the slots 3 and have rollers 7 engaging the undercut portions of the slots 3 and are firmly secured together by a connecting bar 8 having flats 9, for example on collars on the connecting bar 8. Securement of the two parts 5 and 6 to the bar 8 may be by means of cylindrical, externally screw-threaded projections 10 provided on the ends of the bar 8 and having the parts 5 and 6 screwed on to them by means of internally screw-threaded holes in the said parts.

A sleeve 11 having a hole with flats, for example a hexagonal hole, through it and an externally cylindrical surface is mounted on the bar 8 and forms a tight sliding fit thereon. The sleeve 11 is clamped axially in position by the two parts 5 and 6 bearing against the ends thereof. The periphery of the sleeve 11 is covered with a thick layer 12 of synthetic rubber vulcanized to the said periphery and capable of immersion in oil without deterioration. The periphery of the layer 12 is in shape composed of a plurality of, for example six, cylinder-segmental surfaces 13, the radius of each of which approximates to the effective radius of the V-pulley when fully expanded.

A chain composed of pivotal links or a wedge belt of continuous or link-form is mounted on the V-pulleys and has surfaces by which it is supported on the opposed conical faces of the pulleys at distances from their centres which are predetermined by the extent of expansion and contraction of the said pulleys. In the drawings a continuous wedge belt 14 is shown by way of example. The chain or belt 14 is provided on its inner side with projecting teeth 15 which are opposed to that cylinder-segmental surface of the layer 12 which is outermost relative to the V-pulley centre and is in radial register therewith.

In operation, the chain or belt 14 runs on the V-pulleys in the usual manner at radiuses from their centres determined by the extent of expansion and contraction of the pulleys, which may be effected by any suitable means. As the teeth 15 on the chain or belt 14 come successively into radial register with a slide 4, they ride on to the outer surface of the layer 12 of rubber and there is sufficient pressure between them and the said surface to cause them to distort the rubber so that they form temporary depressions in the rubber and the rubber between the depressions is squeezed into the gaps between the teeth, see particularly Figure 2. Thus a substantially positive driving connection is established between the chain or belt 14 and the V-pulleys. When the teeth 15 leave the said surface it regains its normal shape, due to the resiliency or elasticity of the rubber, until it is again distorted by pressure between it and the teeth 15 of the chain or belt 14. This substantially positive or non-frictional driving connection establishes itself automatically at all infinitely variable speed ratios of which the gear is capable and is positive within the limits which the layer 12 is capable of withstanding distortion by the driving strain acting thereon through the teeth 15. The engagement and disengagement of the teeth 15 with the said surface is noiseless and the said layer absorbs shock. Therefore the gear is noiseless and shock absorbing.

When an operative cylinder-segmental surface 13 of each layer 12 becomes no longer efficient due to disintegration or softening under repeated distortion and return to normal state, it is merely necessary to disassemble each slide 6 and reassemble it with each sleeve 11 angularly shifted from its original position, in order to make a previously unused cylinder-segmental surface 13 of each layer 12 operative and thereby restore the gear to its original degree of efficiency.

In the construction of slide shown in Figures 4 and 5, the slide 16 is in one piece which carries the rollers 17 and has a boxlike part 18 which is open at the top and bottom and into which fits a block 19 of synthetic rubber having a working face 20 of cylinder-segmental shape. The block 19 is removably secured in position by a bottom plate 21 and a top frame 22 secured to the box-like part 18 by headed bolts 23 and nuts 24. The block 19 operates in a manner similar to the layer 12 and can be readily removed for replacement when it has lost its efficiency.

In the construction of slide shown in Figures 6 and 7, the slide 25 is in one piece which carries the rollers 26 and has a layer or block 27 of synthetic rubber irremovably vulcanized or otherwise affixed to it. In this construction, renewal is effected by renewal of the whole slide.

The hereinbefore mentioned layers and blocks may be solid or be hollow. Where they are made hollow to increase the ease of their distortion by the teeth of the chain or belt, air or a liquid such as oil or any suitable material of different resiliency or elasticity to that of the rubber may be imprisoned in the said hollow. For example, as shown in Figure 8, a layer 27 may be employed irremovably attached to a metal bush 28 and otherwise similar to the layer 12, except that it contains an annular enclosed space 29 in which air, or other gas or oil or other liquid or any other suitable material is imprisoned. In Figure 9 a block 30 is shown which is otherwise similar to the block 19 in its form and application, but has a rectangular enclosed space 31 in which air or other gas or oil or other liquid or any other suitable material is imprisoned.

The said rollers may fit the undercut portions of the slots in the V-pulleys slackly so that there is no pressure between the layers or blocks and the teeth of the chain or belt when the gear is stationary, and therefore adjustment of the gear ratio when the gear is not running can be effected without strain on or damage to the gear. Centrifugal effect ensures the creation of the said pressure when the gear is running.

I claim:

1. A variable speed gear comprising in combination V-pulleys, an endless driving member running on the said V-pulleys, teeth on the inner face of the endless driving member, slides radially movable on the said pulleys, and an elastic member provided on each of the said slides for the said teeth to sink into temporarily against the elastic action of the elastic member and thereby form between the endless driving member and the V-pulleys a non-slipping driving connection.

2. A variable speed gear comprising in combination V-pulleys, an endless driving member running on the said V-pulleys, teeth on the inner face of the endless driving member, slides radially movable on the said pulleys, and a solid piece of rubber provided on each of the said slides for the said teeth to sink into against the inherent elasticity of the elastic member and thereby forming between the endless driving member and the V-pulleys a non-slipping driving connection.

3. A variable speed gear comprising in combination V-pulleys, an endless driving member running on the said V-pulleys, teeth on the inner face of the endless driving member, slides radially movable on the said pulleys, and a hollow piece of rubber provided on each slide and having a substance of different elasticity from the rubber imprisoned in it, the said hollow piece of rubber being for the said teeth to sink into against the inherent elasticity of the same and thereby forming between the endless driving member and the V-pulleys a non-slipping driving connection.

4. A variable speed gear comprising in combination V-pulleys, an endless driving member running on the said V-pulleys, teeth on the inner face of the endless driving member, slides radially movable on the said pulleys, an elastic member provided on each of the slides for the said teeth to sink into and thereby forming a non-slipping driving connection, and means for adjusting the said elastic member for enabling different portions thereof to be presented to the said teeth.

5. A variable speed gear comprising in combination V-pulleys, an endless driving member running on the said V-pulleys, teeth on the inner face of the endless driving member, slides radially movable on the said pulleys, and an elastic member disconnectably mounted on each of the slides for the said teeth to sink into and thereby forming a non-slipping driving connection between the endless driving member and the V-pulleys.

6. A variable speed gear comprising in combination V-pulleys, an endless driving member running on the said V-pulleys, teeth on the inner face of the endless driving member, slides radially movable on the said pulleys, and an angularly adjustable elastic member provided on each slide and having a plurality of alternative faces for the said teeth to sink into.

7. A variable speed gear comprising in combination V-pulleys, an endless driving member running on the said V-pulleys, teeth on the inner face of the endless driving member, slides radially movable on the said pulleys, and an elastic member permanently affixed to each slide for the said teeth to sink into and thereby forming a non-slipping connection between the said endless driving member and the slide.

ALFRED BOOTH.